United States Patent Office 2,852,509
Patented Sept. 16, 1958

2,852,509

WASHING OF CELLULOSE ESTERS IN TREATED SODIUM ZEOLITE WATER

Frank M. Volberg and Melvin D. Martin, Kingsport, Tenn., assignors to Eastman Kodak Company, Rochester, N. Y., a corporation of New Jersey No Drawing. Application December 1, 1955
Serial No. 550,472

8 Claims. (Cl. 260—230)

This application relates to a method of washing lower fatty acid esters of cellulose.

In the manufacture of lower fatty acid esters of cellulose, ordinarily cellulose is esterified by reacting thereon with a lower fatty acid anhydride and after some hydrolysis or ripening, the thus obtained cellulose ester is recovered from its solution in acid by precipitating it in suitable physical form and washing the thus obtained product.

Various methods of washing cellulose esters have been described in the prior art. For instance, in one case cellulose esters have been washed with filtered water having sufficient calcium alkalinity therein to impart a pH to the water of 7–9. This washing procedure has been alleged to give a product having improved heat stability. In another case cellulose acetate has been washed with dilute alkali metal salt solution which was alleged to stabilize the cellulose ester. The washing of cellulose acetate with water having no more than 10 p. p. m. mineral content has also been suggested as has been the washing of cellulose ester material with hard water which had been acidified with sulfuric acid to a pH of 4.5–5.5. In other cases cellulose esters have been washed with acidified water at elevated temperatures. In all of these various washing operations, however, there remains the possibility that a cellulose ester having a salt content sufficient to affect the viscosity of the resulting product in organic solvents particularly acetone will be obtained. This effect is discussed with particularity in U. S. Patent 2,126,489 of Carl J. Malm.

Almost all of the previous washing operations have left something to be desired for one reason or another. Although the washing of cellulose esters with demineralized water does, if properly carried out, eliminate or reduce salt effect on its viscosity in organic solvents, the product is likely to be poorly stable to heat or storage. Where a softened water is employed for washing a cellulose ester, some reduction of salt effect may be obtained, but the product often falls short of optimum color and stability. If the water employed for washing the cellulose ester is a surface or ground water which has been clarified and purified by filtering, the ester washed therewith is usually characterized by good stability, but is lacking in desired color and viscosity properties; or in other words, the salt effect is quite pronounced. The salt effect increases the viscosity of a cellulose ester in solution in a common organic solvent at a given concentration and hence that effect is avoided in most uses of cellulose ester solutions where possible.

In any practical production process for producing a cellulose ester having a lower salt effect, there are five important factors; namely: (1) the cost of the process; (2) the stability of the ester obtained; (3) the color of the ester; (4) the degree of elimination of salt effect; and (5) the uniformity of the ester or ease of control. One object of our invention is to provide a procedure for the washing of cellulose esters which results in an exceptionally good combination of all of these factors. Other objects of our invention will appear herein.

We have found that by a certain procedure, we are able to obtain a uniform decrease of the effect of salts on a cellulose ester and also obtain a uniformly improved color and stability to aging or heat at a minimum of cost.

We have found that the thorough washing of cellulose esters with a certain type of water results in a product which possesses all of the advantages and none of the disadvantages of prior washing operations. We have found that by the addition of a nonvolatile acid to sodium zeolite softened water in an amount such that the water has an after-boil pH of 3.5–9 and preferably 5–7.5 that cellulose esters can be washed therein to a condition in which the dry esters have a uniformly reduced salt effect and desirable stability and color characteristics. The water which is employed for washing the cellulose ester need not be boiled, but the criterion of the amount of acid which should be added is that a water is produced which, if boiled, would have a pH within the range of 3.5–9, because of the elimination of the effect on pH of dissolved $CO_2$ which might be present in the water. The thoroughness with which the ester is washed with this water may govern whether optimum freedom from salt effect and optimum stability and color are obtained.

Water which has been softened with sodium zeolite usually has a pH of about 7.5 and boiling generally increases that pH value to 9.5 or more because of the loss of $CO_2$ therefrom. In our process it is the after-boiled pH of the water which indicates its effectiveness for obtaining a good washed cellulose ester product. In preparing water such as is to be employed in operations in accordance with our invention, it is only necessary to first take but a small measured portion of the water from which to calculate the amount of acid desirable to give an after-boil pH between 3.5 and 9 for the entire mass of water. The after-boil pH is determined by first adding the acid and then boiling the water followed by determining the pH. After a portion of the water has been so treated and the amount of acid to be added to the main mass has been calculated, that water is then acidified so as to be ready for use in washing operations.

The acid which is employed in treating the sodium zeolite softened water is any nonvolatile acid which is stable at the temperatures which are used to dry the cellulose ester such as up to 300° F. Acids which are suitable for use in this connection are for instance sulfuric, oxalic, phosphoric, and any other acids which are stable and not volatile at the drying temperatures used. After the water has been acidified with the calculated quantity of acid with or without boiling thereof (boiling of the water being unnecessary) the cellulose ester is washed therewith preferably to the point that no pH effect is noted in the spent washed water from acid from the cellulose ester being washed. The cellulose ester is then dried in the usual manner.

Our invention is directed to the washing of any of the usual lower fatty acid esters of cellulose such as cellulose acetate, particularly that having an acetyl content of 38–42% acetyl, cellulose acetate propionate, cellulose acetate butyrate, cellulose propionate, and cellulose butyrate. The following examples illustrate our invention:

*Example 1*

A cellulose acetate which had been prepared by reacting upon cellulose with acetic anhydride and a sulfuric acid catalyst and which had been hydrolyzed by adding aqueous acetic acid thereto which cellulose acetate had an acetyl content of 39.5% and was in solution in the aqueous acid in which it was hydrolyzed, was precipitated in aqueous acid in the form of small uniform flakes. The cellulose acetate thus obtained was thoroughly washed in a water prepared as follows:

Clarified surface water was softened with sodium zeolite. Oxalic acid was added to this softened water in an amount so that the after-boil pH of the water was approximately 7.0.

The precipitated cellulose acetate was washed with this water in a series of immersion and drain washes in a tank having a slotted bottom until the ester was essentially free of acetic acid. The ester was then dried without any further treatment in a drier at a temperature of 250° F. The cellulose acetate thus obtained had an unusual combination of color, viscosity, stability and uniformity properties.

*Example 2*

A cellulose acetate propionate containing 39% acetyl and 1% propionyl was precipitated from its solution in aqueous acetic acid and propionic acid in which it had been hydrolyzed. The product was obtained in the form of a fine uniform granular powder. Water was prepared by passing filtered ground water through a sodium zeolite. The cellulose acetate propionate powder was washed by spraying the ester with this unadjusted sodium zeolite treated water in a false bottom tank until essentially all of the acetic and propionic acid had been removed therefrom. The cellulose ester was then rinsed twice with sodium zeolite water which had been adjusted with sulfuric acid to an after-boil pH of 7. The ester was then dried without any further treatment by means of a vacuum drier. The resulting product has an unusual combination of desirable properties as regards color, stability, and uniformity as compared with cellulose esters washed by other known washing processes.

*Example 3*

A cellulose acetate which had been prepared by reacting upon cellulose with acetic anhydride and a sulfuric acid catalyst and which had been hydrolyzed by adding aqueous acetic acid thereto which cellulose acetate had an acetyl content of 39.5% and was in solution in the aqueous acid in which it was hydrolyzed, was precipitated in aqueous acid in the form of small uniform flakes. The cellulose acetate thus obtained was thoroughly washed in a water prepared as in Example 1 except that phosphoric acid was used for the adjustment and the after-boil pH was approximately 5.0.

The precipitated cellulose acetate was washed with this water in a series of immersion and drain washes in a tank having a slotted bottom until the ester was essentially free of acetic acid. The ester was then dried without any further treatment in a drier at a temperature of 250° F. The cellulose acetate thus obtained had an unusual combination of color, viscosity, stability and uniformity properties.

The water employed herein is softened initially by contacting it with sodium base type zeolite compounds such as are commonly employed for removing alkaline earth metal ions from water.

We claim:
1. A method of refining a lower fatty acid ester of cellulose which comprises thoroughly washing the cellulose ester while in loose form with a sodium zeolite ground water to which has been added an amount of an acid, selected from the group consisting of sulfuric, oxalic, phosphoric and other acids which are stable and non-volatile at temperatures up to 300° F., sufficient to impart to the water, an after boil pH of 3.5–9.

2. A method of refining cellulose acetate which comprises thoroughly washing the cellulose acetate while in loose form with a sodium zeolite ground water to which has been added an amount of an acid, selected from the group consisting of sulfuric, oxalic, phosphoric and other acids which are stable and non-volatile at temperatures up to 300° F., sufficient to impart to the water an after boil pH of 3.5–9.

3. A method of refining cellulose acetate propionate which comprises thoroughly washing the cellulose acetate propionate while in loose form with a sodium zeolite ground water to which has been added an amount of an acid, selected from the group consisting of sulfuric, oxalic, phosphoric and other acids which are stable and non-volatile at temperatures up to 300° F., sufficient to impart to the water an after boil pH of 3.5–9.

4. A method of refining cellulose acetate butyrate which comprises thoroughly washing the cellulose acetate butyrate while in loose form with a sodium zeolite ground water to which has been added an amount of an acid, selected from the group consisting of sulfuric, oxalic, phosphoric and other acids which are stable and non-volatile at temperatures up to 300° F., sufficient to impart to the water an after boil pH of 3.5–9.

5. A method of refining a lower fatty acid ester of cellulose which comprises thoroughly washing the ester while in loose form with a sodium zeolite ground water to which has been added an amount of sulfuric acid sufficient to impart to the water an after boil pH of 3.5–7.

6. A method of refining a lower fatty acid ester of cellulose which comprises thoroughly washing the ester while in loose form with a sodium zeolite ground water to which has been added an amount of oxalic acid sufficient to impart to the water an after boil pH of 3.5–7.

7. A method of refining a lower fatty acid ester of cellulose which comprises thoroughly washing the ester while in loose form with a sodium zeolite ground water to which has been added an amount of phosphoric acid sufficient to impart to the water an after boil pH of 3.5–7.

8. A method of refining a lower fatty acid ester of cellulose which comprises thoroughly washing the cellulose ester while in loose form with a sodium zeolite ground water to which has been added an amount of an acid, selected from the group consisting of sulfuric, oxalic, phosphoric and other acids which are stable and non-volatile at temperatures up to 300° F., sufficient to impart to the water an after boil pH of 5–7.5.

References Cited in the file of this patent

UNITED STATES PATENTS

| | | |
|---|---|---|
| 1,921,949 | Sheppard | Aug. 8, 1933 |
| 2,244,295 | Heath et al. | June 3, 1941 |
| 2,365,258 | Farquhar | Dec. 19, 1944 |
| 2,600,716 | White et al. | June 17, 1952 |